US009159316B2

(12) United States Patent
Cohen et al.

(10) Patent No.: US 9,159,316 B2
(45) Date of Patent: Oct. 13, 2015

(54) AUTOMATIC LANGUAGE MODEL UPDATE

(71) Applicant: Goggle Inc., Mountain View, CA (US)

(72) Inventors: Michael H. Cohen, Portola Valley, CA (US); Shumeet Baluja, Leesburg, VA (US); Pedro J. Mengibar, Jersey City, NJ (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/888,770

(22) Filed: May 7, 2013

(65) Prior Publication Data

US 2013/0246065 A1 Sep. 19, 2013

Related U.S. Application Data

(63) Continuation of application No. 13/616,468, filed on Sep. 14, 2012, now Pat. No. 8,447,600, which is a continuation of application No. 12/786,102, filed on May 24, 2010, now Pat. No. 8,423,359, which is a continuation of application No. 11/396,770, filed on Apr. 3, 2006, now Pat. No. 7,756,708.

(51) Int. Cl.
*G10L 15/00* (2013.01)
*G10L 15/06* (2013.01)
(Continued)

(52) U.S. Cl.
CPC .............. *G10L 15/06* (2013.01); *G10L 15/065* (2013.01); *G10L 15/187* (2013.01); *G10L 2015/0635* (2013.01)

(58) Field of Classification Search
CPC ......... G10L 15/22; G10L 15/00; G10L 21/06; G10L 15/063; G10L 15/065; G10L 13/06; G10L 13/08; G10L 13/10; G10L 15/26; G06F 3/167; G06F 17/30; G06F 17/2818

USPC ......... 704/231, 244, 243, 251, 252, 253, 257, 704/270, 275
See application file for complete search history.

(56) References Cited

U.S. PATENT DOCUMENTS 5,745,875 A * 4/1998 Jackson et al. ............... 704/235
5,802,488 A 9/1998 Edatsune
(Continued)

FOREIGN PATENT DOCUMENTS

EP 1 047 046 10/2000
WO WO 99/50830 10/1999
(Continued)

OTHER PUBLICATIONS

Witbrock and Hauptmann "Improving Acoustic Models by Watching Television", Personal communications, Feb. 1997.*
(Continued)

*Primary Examiner* — Abdelali Serrou
(74) *Attorney, Agent, or Firm* — Fish & Richardson P.C.

(57) ABSTRACT

A method for generating a speech recognition model includes accessing a baseline speech recognition model, obtaining information related to recent language usage from search queries, and modifying the speech recognition model to revise probabilities of a portion of a sound occurrence based on the information. The portion of a sound may include a word. Also, a method for generating a speech recognition model, includes receiving at a search engine from a remote device an audio recording and a transcript that substantially represents at least a portion of the audio recording, synchronizing the transcript with the audio recording, extracting one or more letters from the transcript and extracting the associated pronunciation of the one or more letters from the audio recording, and generating a dictionary entry in a pronunciation dictionary.

17 Claims, 8 Drawing Sheets

(51) Int. Cl.
*G10L 15/065* (2013.01)
*G10L 15/187* (2013.01)

(56) References Cited

U.S. PATENT DOCUMENTS

| | | | |
|---|---|---|---|
| 5,842,161 A * | 11/1998 | Cohrs et al. | 704/251 |
| 5,895,448 A | 4/1999 | Vysotsky et al. | |
| 5,960,392 A | 9/1999 | Sundberg et al. | |
| 6,138,099 A * | 10/2000 | Lewis et al. | 704/257 |
| 6,167,117 A | 12/2000 | Will | |
| 6,167,398 A * | 12/2000 | Wyard et al. | 1/1 |
| 6,208,964 B1 | 3/2001 | Sabourin | |
| 6,230,126 B1 * | 5/2001 | Kuroda | 704/231 |
| 6,363,348 B1 | 3/2002 | Besling et al. | |
| 6,463,413 B1 * | 10/2002 | Applebaum et al. | 704/256.2 |
| 6,473,778 B1 * | 10/2002 | Gibbon | 715/201 |
| 6,483,896 B1 | 11/2002 | Goldberg et al. | |
| 6,484,136 B1 | 11/2002 | Kanevsky et al. | |
| 6,516,312 B1 * | 2/2003 | Kraft et al. | 707/610 |
| 6,532,444 B1 * | 3/2003 | Weber | 704/257 |
| 6,535,849 B1 | 3/2003 | Pakhomov et al. | |
| 6,690,772 B1 | 2/2004 | Naik et al. | |
| 6,792,408 B2 | 9/2004 | Sauber | |
| 6,804,330 B1 * | 10/2004 | Jones et al. | 379/88.01 |
| 6,823,306 B2 | 11/2004 | Reding et al. | |
| 6,912,498 B2 | 6/2005 | Stevens et al. | |
| 6,915,262 B2 | 7/2005 | Reding et al. | |
| 6,975,983 B1 | 12/2005 | Fortescue et al. | |
| 6,975,985 B2 | 12/2005 | Kriechbaum et al. | |
| 7,027,987 B1 | 4/2006 | Franz et al. | |
| 7,089,188 B2 * | 8/2006 | Logan et al. | 704/270 |
| 7,103,533 B2 * | 9/2006 | Lewis et al. | 704/9 |
| 7,133,829 B2 | 11/2006 | Cyr et al. | |
| 7,260,529 B1 | 8/2007 | Lengen | |
| 7,272,558 B1 | 9/2007 | Soucy et al. | |
| 7,366,668 B1 | 4/2008 | Franz et al. | |
| 7,398,209 B2 * | 7/2008 | Kennewick et al. | 704/255 |
| 7,640,160 B2 * | 12/2009 | Di Cristo et al. | 704/257 |
| 7,756,708 B2 | 7/2010 | Cohen et al. | |
| 8,165,886 B1 | 4/2012 | Gagnon et al. | |
| 8,423,359 B2 | 4/2013 | Cohen et al. | |
| 8,447,600 B2 | 5/2013 | Cohen et al. | |
| 2002/0065653 A1 | 5/2002 | Krichbaum et al. | |
| 2002/0072916 A1 | 6/2002 | Friedman | |
| 2002/0107918 A1 * | 8/2002 | Shaffer et al. | 709/203 |
| 2002/0128818 A1 * | 9/2002 | Ho et al. | 704/9 |
| 2002/0143555 A1 * | 10/2002 | Luchaup | 704/277 |
| 2003/0023435 A1 | 1/2003 | Josephson | |
| 2004/0054530 A1 * | 3/2004 | Davis et al. | 704/231 |
| 2004/0138881 A1 * | 7/2004 | Divay et al. | 704/231 |
| 2004/0162728 A1 | 8/2004 | Thompson et al. | |
| 2004/0210442 A1 | 10/2004 | Glynn et al. | |
| 2004/0228456 A1 | 11/2004 | Glynn et al. | |
| 2005/0004854 A1 | 1/2005 | Jones et al. | |
| 2005/0071171 A1 * | 3/2005 | Dvorak | 704/275 |
| 2005/0144001 A1 | 6/2005 | Bennett et al. | |
| 2005/0216273 A1 * | 9/2005 | Reding et al. | 704/275 |
| 2006/0002607 A1 | 1/2006 | Boncyk et al. | |
| 2006/0167928 A1 * | 7/2006 | Chakraborty et al. | 707/102 |
| 2006/0212288 A1 | 9/2006 | Sethy et al. | |
| 2006/0235684 A1 | 10/2006 | Chang | |
| 2007/0005570 A1 | 1/2007 | Hurst-Hiller et al. | |
| 2007/0067275 A1 * | 3/2007 | Shekel | 707/4 |
| 2007/0118376 A1 | 5/2007 | Murkerjee | |
| 2007/0207821 A1 | 9/2007 | Tran | |

FOREIGN PATENT DOCUMENTS

| | | |
|---|---|---|
| WO | WO 01/63596 | 8/2001 |
| WO | WO 02/089112 | 11/2002 |

OTHER PUBLICATIONS

Authrozied Officer L. Young. International Search Report and Written Opinion in International Application No., PCT/US2007/65892, mailed Mar. 6, 2008, 12 pages.

Authorized Officer P. Becamel. International Preliminary Report on Patentability in International Application No. PCT/US2007/65892, mailed Oct. 8, 2008, 9 pages.

Authorized Offcier R. Quelavoine, European Search Report for Application No. 11180859.8-1224/2453436, dated Jun. 5, 2012, 6 pages.

Authorized Officer R. Quelavoine, Extended European Search Report for Application No. EP 11180864.8-1224, dated Mar. 7, 2012, 6 pages.

Authorized Officer R. Quelavoine, European Supplementary Search Report for Application No. EP 0776052.6-1224, dated Sep. 20, 2010, 10 pages.

"Confidence Measures for Large Vocabulary Continuous Speech Recognition" by Wessel et al, for *IEEE Transactions on Speech and Audio Processing*, vol. 9, No. 3, Mar. 2001, pp. 288-298.

"Lightly Supervised Acoustic Model Training Using Consensus Networks" by Chen et al., for *IEEE*, 2004, pp. I-189-I-192.

"Unsupervised Language Model Adaptation for Broadcast News", by Chen et al., for *IEEE*, 2003, pp. I-220-I-223.

"Transcribing Audio-Video Archives", by Barras et al., for *IEEE*, 2002, pp. I-13-I-16.

"Automatic Transcription of Compressed Broadcast Audio", by Barras et al., for *IEEE*, 2001, pp. 265-268.

"Transcription and Indexation of Broadcast Data", by Gauvain et al., for *IEEE*, 2001, pp. 1663-1666.

"Transcribing Broadcast News Shows", by Gauvain et al., for *IEEE*, 1997, pp. 715-718.

Riccardi, "Stochastic Language Adaptation over Time and State in Natural Spoken Dialog Systems," IEEE Transactions on Speech and Audio Processing, III Service Center, New York, NY; vol. 8, No. 1, Jan. 1, 2000, 8 pages.

Jang et al., "Improving Acoustic Models with Captioned Multimedia Speech," IEEE 1999, 767-771.

* cited by examiner

AUTOMATIC LANGUAGE MODEL UPDATE

CROSS-REFERENCE TO RELATED APPLICATIONS

This application is a continuation application of and claims priority to U.S. application Ser. No. 13/616,468, filed Sep. 14, 2012, which is a continuation of U.S. application Ser. No. 12/786,102, filed on May 24, 2010, which is a continuation application of and claims priority to U.S. application Ser. No. 11/396,770, filed Apr. 3, 2006, which are incorporated by reference herein.

TECHNICAL FIELD

This application relates to an automatic language system and method.

BACKGROUND

Speech recognition systems may receive and interpret verbal input from users and may take actions based on the input. For example, some users employ speech recognitions systems to create text documents based on spoken words. A user may speak into a microphone connected to a computer, and speech recognition software installed on the computer may receive the spoken words, translate the sounds into text, and output the text to a display.

Current speech recognition systems, however, do not translate the spoken words with complete accuracy. Sometimes the systems will translate a spoken word into text that does not correspond to the spoken word. This problem is especially apparent when the spoken word is a word that is not in a language model accessed by the speech recognition system. The system receives the new spoken word, but incorrectly translates the word because the new spoken word does not have a corresponding textual definition in the language model. For example, the words "da shiznet" expresses a popular way, in current language, to describe something that is "the best." Language models, however, may not include this phrase, and the system may attempt to translate the phrase based on current words in the language model. This results in incorrect translation of the phrase "da shiznet" into other words, such as "dashes net."

Additionally, current speech recognition systems may incorrectly translate a spoken word because people may pronounce the word differently. For example, if a speech recognition system is accessed by people from different regions of a country, the users may have particular regional accents that cause a recognition system to translate their spoken words incorrectly. Some current systems require that a user train the speech recognition system by speaking test text so that it recognizes the user's particular pronunciation of spoken words. This method, however, creates a recognition system that is trained to one user's pronunciation, and may not accurately translate another user's verbal input if it is pronounced differently.

SUMMARY

This document discloses methods and systems for updating a language model used in a speech recognition system.

In accordance with one aspect, a method for generating a speech recognition model is disclosed. The method includes accessing a baseline speech recognition model, obtaining information related to recent language usage from search queries, and modifying the speech recognition model to revise probabilities of a portion of a sound occurrence based on the information. In some instances, the portion of the sound may be a word.

In some implementations, the method further includes receiving from a remote device a verbal search term that is associated with a text search term using a recognizer implementing the speech recognition model. The method may also include transmitting to the remote device search results associated with the text search term and transmitting to the remote device the text search term.

In other implementations, the method may include receiving a verbal command for an application that is associated with a text command using a recognizer implementing the speech recognition model. The speech recognition model may assign the verbal command to a sub-grammar slot. The speech recognition model may be a rule-based model, a statistical model, or both. The method may further include transmitting to a remote device at least a portion of the modified speech recognition model. The remote device may access the portion of the modified speech recognition model to perform speech recognition functions.

In yet other implementations, the speech recognition model may include weightings for co-concurrence events between two or more words. The speech recognition model may also include weightings associated with when the search queries are received. Obtaining the information related to recent language, as mentioned in the method above, may include generating word counts for each word.

In accordance with another aspect, a method for generating a speech recognition model is disclosed. This method includes receiving at a search engine from a remote device an audio recording and a transcript that substantially represents at least a portion of the audio recording, synchronizing the transcript with the audio recording, extracting one or more letters from the transcript and extracting an associated pronunciation of the one or more letters from the audio recording, and generating a dictionary entry in a pronunciation dictionary. The audio recording and associated transcript may be part of a video, and the remote device may be a television transmitter. The remote device may also be a personal computer.

In one implementation, the dictionary entry comprises the extracted one or more letters and the associated pronunciation. The method further includes receiving verbal input that is identified by a recognizer that accesses the pronunciation dictionary. The method may also include receiving multiple audio recordings and transcripts and separating the recordings and transcripts into training and test sets. A set of weightings may be applied to the association between one or more letters and the pronunciation in the training set, and a weight may be selected from the set that produces a greatest recognition accuracy when processing the test set. The dictionary entry may also include weightings associated with when the transcript was received.

In accordance with another aspect, a system for updating a language model is disclosed. The system includes a request processor to receive search terms, an extractor for obtaining information related to recent language usage from the search terms, and means for modifying a language model to revise probabilities of a word occurrence based on the information.

In accordance with yet another aspect, a computer implemented method for transmitting verbal terms is disclosed. The computer implemented method includes transmitting search terms from a remote device to a server device, wherein the server device generates word occurrence data associated with the search terms and modifies a language model based on the word occurrence data. The remote device may be selected from a group consisting of a mobile telephone, a personal digital assistant, a desktop computer, and a mobile email device.

The systems and methods described here may provide one or more of the following advantages. A system may provide a language model that is updated with words derived from recent language usage. The updated language model may be accessible to multiple users. The system may also permit updating the language model with multiple pronunciations of letters, words, or other sounds. The system may accurately recognize words without training by an individual user. Such a system may permit improved accuracy of word recognition based on occurrence data and pronunciation information gathered from multiple users and data sources. Additionally, the system can transmit updated word recognition information to remote systems with speech recognition systems, such as cellular telephones and personal computers.

The details of one or more implementations are set forth in the accompanying drawings and the description below. Other features, objects, and advantages of the various implementations will be apparent from the description and drawings, and from the claims.

DESCRIPTION OF DRAWINGS

Like reference symbols in the various drawings indicate like elements.

DETAILED DESCRIPTION

Figure 1:
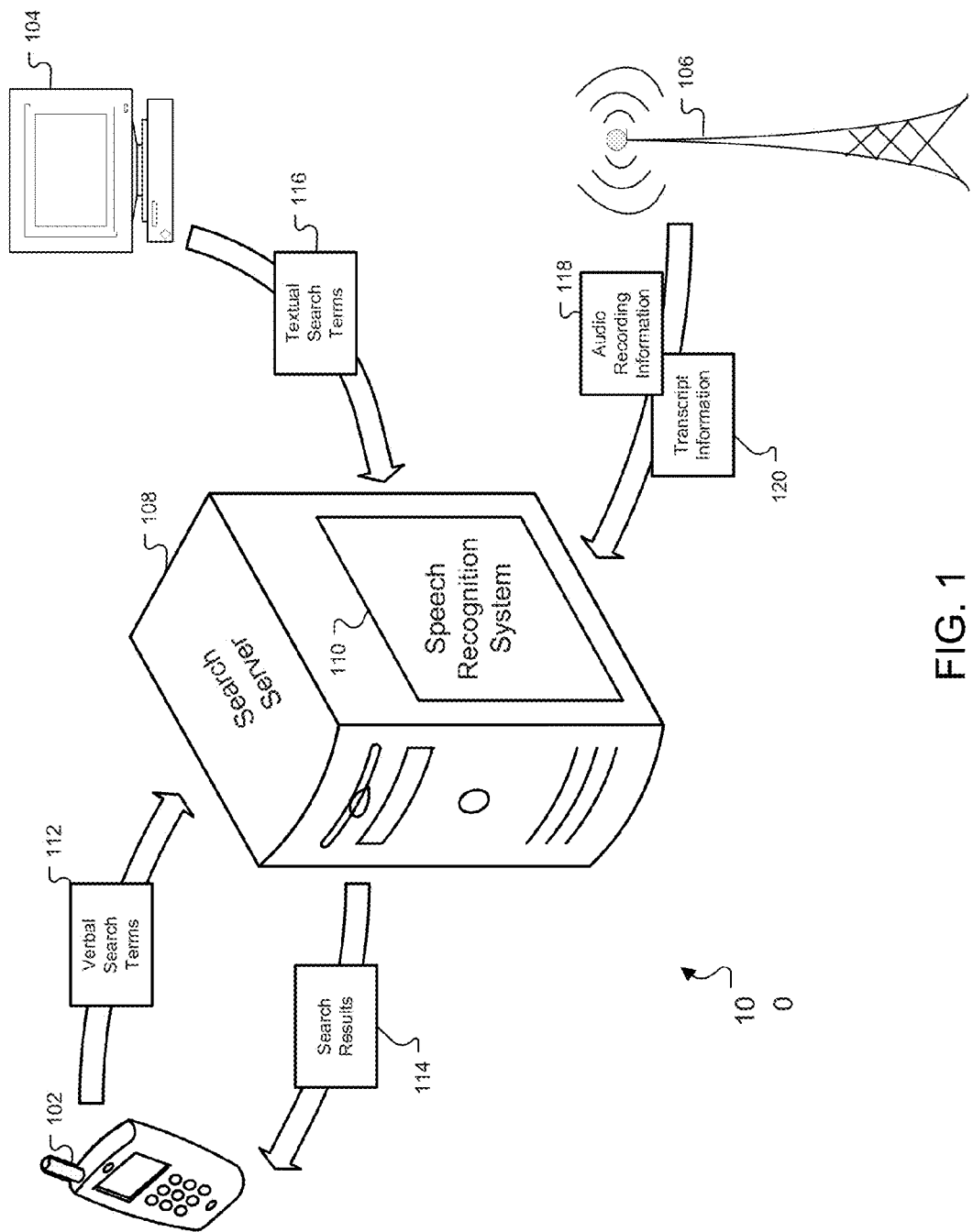
FIG. 1 shows a data entry system able to perform speech recognition on data received from remote audio or text entering devices according to one implementation.

FIG. 1 shows a data entry system 100 able to perform speech recognition on data received from remote audio or text entering devices according to one implementation. The system 100 as shown includes a cellular device 102, a networked personal computer 104, a television broadcast antenna 106, and a search server 108 that includes a speech recognition system 110. In FIG. 1, the search server 108 receives textual or audio data from the personal computer 104 and the television broadcast tower 106, respectively and uses it to build or update a language model accessed by the speech recognition system 110. User submission of current search terms 116 enables the speech recognition system 110 to create entries in a language model that correspond to new words and phrases used by people. Similarly, the speech recognition system 110 may use received audio recording information 118 and transcript information 120 to create entries that reflect the pronunciation of new words or phrases related to current events, such as those discussed in news reports. In one implementation, the search server 108 updates the speech recognition system to enable future users to take advantage of the previously performed searches.

A user may enter verbal search terms 112 into the cellular device 102, which transmits the search terms 112 to the search server 108. The speech recognition system 110 accesses the language model and translates the verbal search terms to text. Search server 108 then accesses search results based on the translated text, and transmits the search results 114 to the cellular device 102.

Updating the language model based on current searches enables the speech recognition system 110 to recognize varied and current words and phrases more accurately. For example, a powerful storm in Sri Lanka may occur and be reported in the news. The words "Sri Lanka" may not be easily recognized by a language model because an entry linking the sound of the word "Sri Lanka" with the text may not exist. Search engine users, however, may enter the words "Sri Lanka" to find more information about the storm. Additionally, television newscasts may report on the storm. The search server 108 may receive the textual search terms 116 related to the storm, and it may also receive the audio recording information 118 and associated transcript information 120 for news casts, which report on the Sri Lankan storm. The speech recognition system 110 implemented at the search server 108 uses the search terms to determine a probability that the word "Sri Lanka" will be spoken by a user. Also, the system 110 uses the audio recording information 118 and the transcript information 120 to supplement the language model with entries that define how the word "Sri Lanka" sounds and the text that is associated with it. This is described in greater detail in association with FIG. 2.

The updated language model enables a speech recognition system to recognize the words "Sri Lanka" more accurately. For example, a user curious about the situation in Sri Lanka may enter a verbal request "I would like the weather for Sri Lanka today" into the cellular device 102. The verbal request may enter the system 100 as verbal search terms 112 spoken into the cellular device 102. A search client implemented at the cellular device 102 may receive the verbal search terms 112. The search client transmits the verbal search terms 112 to the search server 108, where the verbal search terms 112 are translated into textual data via a speech recognition system 110.

The speech recognition system 110 receives verbal search terms and uses the language model to access the updated entries for the word "Sri Lanka" and recognize the associated text. The search server 108 retrieves the requested data for weather in Sri Lanka based on the search terms that have been translated from verbal search terms to text, collects the search results 114, and transmits the search results for the weather in Sri Lanka to the cellular device 102. In one implementation, the cellular device 102 may play a synthesized voice through an audio speaker that speaks the results to the user. In another implementation, the device may output the weather results for Sri Lanka to a display area on the cellular device 102. In yet another implementation, the results may be displayed on the cellular device and read by a synthesized voice using the cellular device's speaker 102. It is also possible to give the user display or audio feedback when a request has not been entered, such as when the system has new updates or appropriate information to pass along to the cellular device 102.

Referring again to FIG. 1, a personal computer 104 with networking capabilities is shown sending textual search terms 116 to the search server 108. The entered textual search terms, which may include one ore more portions of sound, could be added to the available dictionary terms for a speech recognition system 110. A probability value may be assigned to the complete terms or the portions of sound based on a chronological receipt of the terms or sounds by the search server 108 or number of times the terms are received by search server 108. Popular search terms may be assigned higher probabilities of occurrence and assigned more prominence for a particular time period. In addition, the search may also return data to the device to update probabilities for the concurrence of the words. In particular, other terms associated with a search can have their probabilities increased if the terms themselves already exist in the dictionary. Also, they may be added to the dictionary when they otherwise would not have been in the dictionary. Additionally, a dictionary entry may be changed independently of the others and may have separate probabilities associated with the occurrence of each word.

For example, if users submit a particular search term, such as "Sri Lanka," frequently, the probability of occurrence for that word can be increased.

Speech recognition systems may depend on both language models (grammar) and acoustic models. Language models may be rule-based, statistical models, or both. A rule based language model may have a set of explicit rules describing a limited set of word strings that a user is likely to say in a defined context. For example, a user is accessing his bank account is likely to only say a limited number of words or phrases, such as "checking," and "account balance." A statistical language model is not necessarily limited to a predefined set of word strings, but may represent what word strings occur in a more variable language setting. For example, a search entry is highly variable because any number of words or phrases may be entered. A statistical model uses probabilities associated with the words and phrases to determine which words and phrases are more likely to have been spoken. The probabilities may be constructed using a training set of data to generate probabilities for word occurrence. The larger and more representative the training data set, the more likely it will predict new data, thereby providing more accurate recognition of verbal input.

Language models may also assign categories, or meanings, to strings of words in order to simplify word recognition tasks. For example, a language model may use slot-filling to create a language model that organizes words into slots based on categories. The term "slot" refers to the specific category, or meaning, to which a term or phrase belongs. The system has a slot for each meaningful item of information and attempts to "fill" values from an inputted string of words into the slots. For example, in a travel application, slots could consist of origin, destination, date or time. Incoming information that can be associated with a particular slot could be put into that slot. For example, the slots may indicate that a destination and a date exist. The speech recognition system may have several words and phrases associated with the slots, such as "New York" and "Philadelphia" for the destination slot, and "Monday" and "Tuesday" for the date slot. When the speech recognition system receives the spoken phrase "to New York on Monday" it searches the words associated with the destination and date slots instead of searching for a match among all possible words. This reduces the time and computational power needed to perform the speech recognition.

Acoustic models represent the expected sounds associated with the phonemes and words a recognition system must identify. A phoneme is the smallest unit a sound can be broken into—e.g., the sounds "d" and "t" in the words "bid" and "bit." Acoustic models can be used to transcribe uncaptioned video or to recognize spoken queries. It may be challenging to transcribe uncaptioned video or spoken queries because of the limitations of current acoustic models. For instance, this may be because new spoken words and phrases are not in the acoustic language model and also because of the challenging nature of broadcast speech (e.g., possible background music or sounds, spontaneous speech on wide-ranging topics).

Figure 2:
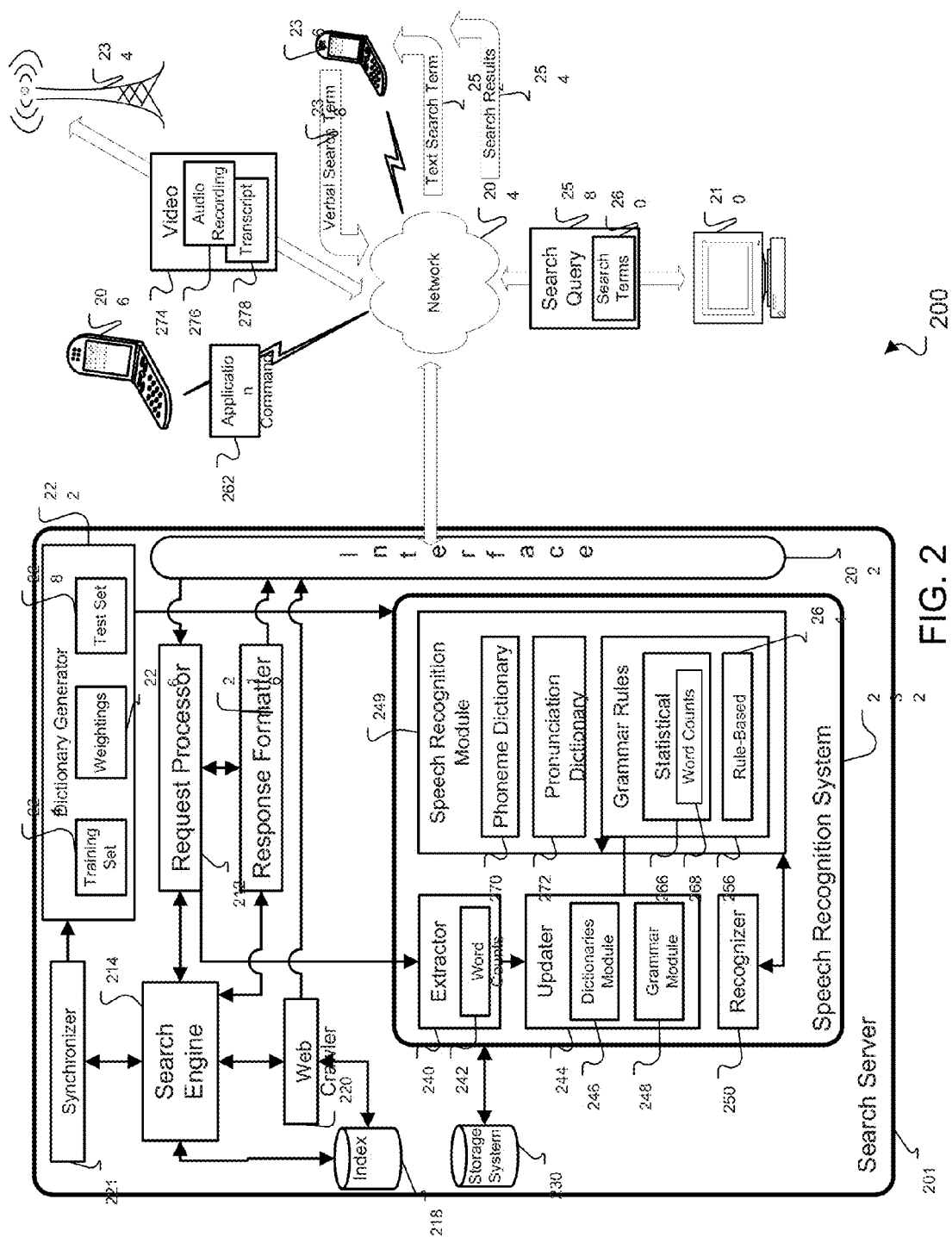
FIG. 2 is a schematic diagram of a search server using a speech recognition system to identify, update and distribute information for a data entry dictionary according to one implementation.

FIG. 2 is a schematic diagram of a search server 201 using a speech recognition system 232 to identify, update and distribute information for a data entry dictionary according to one implementation. A system 200 may be one implementation of the system 100 shown in FIG. 1. The system 200 may be implemented, for example, as part of an Internet search provider's general system. The system 200 is equipped to obtain information about the occurrence and concurrence of terms from various sources. The system 200 also obtains information about the pronunciation of words and phonemes, which include one or more portions of sound, from verbal input associated with textual input. Both types of obtained information are used to generate dictionary information. Such sources could include, for example, audio or transcript data received from a television transmitter, data related to an individual (such as outgoing messages stored in a Sent Items box), data entered verbally or textually into a wireless communication device, or data about search terms entered recently by users of an Internet search service.

The system 200 is provided with an interface 202 to allow communications in a variety of ways. For example, search server 201 may communicate with a network 204 such as a LAN, WAN, the Internet, or other appropriate communication means, and thereby communicate with various devices, such as a wireless communication device 206, a television transmission tower 234, or a personal computer 210. The communication flow for any device may be bidirectional so that the search server system 201 may receive information, such as commands, from the devices, and may also send information to the devices.

Commands and requests received from devices may be provided to request processor 212, which may interpret a request, associate it with predefined acceptable requests, and pass it on, such as in the form of a command to another component of search server system 201 to perform a particular action. For example, where the request includes a search request, the request processor 212 may cause a search client 214 to generate search results corresponding to the search request. Such a search client 214 may use data retrieval and search techniques like those used by the Google PageRank™ system. The results generated by the search client 214 may then be provided back to the original requester using a response formatter 216. The response formatter 216 carries out necessary formatting on the results.

The search client 214 may rely on a number of other components for its proper operation. For example, the search client 214 may refer to an index 218 of web sites instead of searching the web sites themselves each time a request is made, so as to make the searching much more efficient. The index 218 may be populated using information collected and formatted by a web crawler 220, which may continuously scan potential information sources for changing information. The search client 214 may also use a synchronizer 221 to ensure received data updates the system 200 with the latest language model available.

In addition to search results, the system 201 may use the dictionary generator module 244 to provide users with updated dictionary information, which may include user-specific information. The updater module 244 operates by extracting relevant concurrence data or information from previous search terms, generating occurrence data for the information, and organizing the information in a manner that can be transmitted to a remote device, such as a mobile telephone, a personal digital assistant, a desktop computer, and a mobile email device. A user of the remote device may access the occurrence data to increase the accuracy of a speech recognition system implemented at the remote device. For example, an extractor module 240 may extract the words Britney Spears from all the incoming text search terms. The module 240 may then determine word counts 242 based on how many times the words "Britney Spears" occurred in the search terms. The word count is transmitted to the updater module 244, which updates a statistical portion 266 of grammar rules 256, which may be part of a speech recognition model.

Additionally, the word counts 242 may be transmitted to the device 206. The device 206 may have a separate speech recognition system implemented. The device's speech recognition system may receive the word counts 242 and update a language model stored in the device 206. After the device's language model is updated, the device's speech recognition system may access the model and more accurately recognize when the user speaks the words "Britney Spears." More particularly, the speech recognition system could more accurately recognize the term "Britney Spears" instead of misinterpreting the user's verbalization as "Britain's Peers." This is because the word count associated with "Britney Spears" is much higher than the word count associated with "Britain's Peers," which indicates there is a higher probability the user said the former instead of the latter.

The information on which a dictionary generator 222 operates may be general, such as all search terms transmitted recently by a search client, or may be specific, such as search terms entered by members of a particular group. The search server system 201 may receive identifying information from a user's device, and may use that information to determine a group to which the user belongs so that the user is provided more relevant dictionary information. For example, engineers, dentists, or attorneys may self-identify themselves by entering information into the device 106 and may then receive data relevant to that group. In this manner, the dictionary data may be particularly relevant to members of this group. For example, if the user self-identifies herself as an attorney, the occurrence probability associated with the word "co-sign" may be increased to a higher probability relative to the occurrence probability associated with the word "cosine." Therefore, when the attorney enters a verbal term that sounds like "co-sign," the speech recognition system may access a dictionary entry associated with attorneys and more accurately recognize that the desired word is "co-sign."

The dictionary generator 222 may be implemented using the components shown in FIG. 2. In this implementation, it comprises a training set 224, weightings 226, and a test set 228. The training set 224 is a set of audio recordings and associated transcripts used to generate pronunciation and sound entries in a pronunciation dictionary 272 and a phoneme dictionary 270, respectively. Audio recordings may be associated or synched with the associated transcript text using a synchronizer 221, and the dictionary generator 222 may create preliminary dictionary entries based on the synchronized audio recordings and transcripts. In one implementation, the sounds that are extracted from an audio recording correspond to one or more letters from the transcript that is associated and synchronized with the audio recording. The dictionary generator uses these extracted components to generate the dictionary entries.

The preliminary dictionary entries may be tested on a test set of audio recordings and associated transcripts to determine the accuracy of the synching. The test set may be received in the same manner as the training set, but set aside for testing purposes (i.e. not used in generating the preliminary dictionary entries). The preliminary dictionary entries are used to interpret the test set's audio recordings, and an accuracy score is calculated using the associated transcripts to determine if the words in the audio recording were interpreted correctly. The preliminary dictionary entries may include weightings associated with the probabilities that a word was spoken. If the preliminary dictionaries have a low accuracy score when run against the test set, the probability weightings may be revised to account for the incorrectly interpreted words in the test set. For example, if the word "tsunami" was incorrectly interpreted as "sue Tommy," the weightings for the word "tsunami" could be increased to indicate its occurrence was more probable then other similar sounding words. The preliminary dictionary entries may then be re-run on the test set to determine if the accuracy was improved. If required, the weightings associated with the preliminary dictionary entries may be recalculated in an iterative manner until a desired accuracy is reached. In some implementations, a new test set may be used with each change of the weightings to more accurately gauge the effectiveness of the ratings against an arbitrary or changing set of data.

In some embodiments, the weightings may include factors, or coefficients, that indicate when the system received a word associated with the weightings. The factors may cause the system to favor words that were received more recently over words that were received in the past. For example, if an audio and associated transcript that included the word "Britain's peers" was received two years earlier and another audio and transcript that included the word "Britney Spears" was received two days ago, the system may introduce factors into the weightings that reflect this. Here, the word "Britney Spears" would be associated with a factor that causes the system to favor it over "Britain's peers" if there is uncertainty associated with which word was spoken. Adding factors that favor more recently spoken words may increase the accuracy of the system in recognizing future spoken words because the factors account for current language usage by users.

The dictionary generator 222 may access system storage 230 as necessary. System storage 230 may be one or more storage locations for files needed to operate the system, such as applications, maintenance routines, management and reporting software, and the like.

In one implementation, the speech recognition system 232 enables translation of user entered verbal data into textual data. For example, a user of a cellular telephone 236 may enter a verbal search term into the telephone, which wirelessly transmits the data to the network 204. The network 204 transmits information into the interface 202 of the remote search server 201. The interface 202 uploads information into the request processor 212 which has access to the speech recognition system 232. The speech recognition system accesses a phoneme dictionary 270, a pronunciation dictionary 272, or both to decipher the verbal data. After translating the verbal data into textual data, the search server 201 may generate search results, and the interface 202 may send the results back to the network 204 for distribution to the cellular telephone 236. Additionally, a text search term 252 that corresponds to the verbal search term sent by the user may be sent with search results 254. The user may view this translated text search term 252 to ensure the verbal term was translated correctly.

The speech recognition system uses an extractor to analyze word counts 242 from the entered search term(s) and an updater 244 with dictionary 246 and grammar modules 248 to access the current speech recognition model 249. The speech recognition model 249 may also make use of a recognizer 250 to interpret verbal search terms. The speech recognition system 232 includes a response formatter 216 that may arrange search results for the user.

User data could also be entered in the form of an application command 262. For example, a user of a cellular device 206 may have a web-based email application displayed on the device 206 and may wish to compose a new mail message. The user may say "compose new mail message," and the command may be sent wirelessly to the network 204, transferred to a remote search server 201 interface 202, entered into the request processor 212 and transferred into the speech recognition system 232. The speech recognition system may use a recognizer 250 to determine if the entry is a command or a search.

In one implementation, the recognizer 250 determines a context for the verbal command by assessing identifier information that is passed with the command by the device 206. For example, the transmission that includes the command may also include information identifying the URL of the web-based email client the user is currently accessing. The recognizer 250 uses the URL to determine that the command is received in the context of an email application. The system then may invoke the speech recognition module 249 to determine which command has been requested. The speech recognition module 249 may use a rule based grammar 264 to find the meaning of the entered command. The speech recognition system 232 may determine the entry is a compose command, for example, by comparing the spoken words "compose new mail message" to a set of commands and various phrases and pronunciations for that text command. Once the textual word or words are identified, the command may be processed using the translated text command to identify and execute the desired operation. For example, the text "compose" may be associated with a command that opens up a new mail message template. The update web screen is then transmitted to the cellular device 206.

The search server 201 may receive data from television transmitters 234 in the form of video 274, which includes an audio recording 276, and an associated transcript 278. For example, a news broadcast video containing audio and transcript data could be sent from a television transmitter 234 to a search server 201 via a network 204. A synchronizer 221 may be used to match the audio portion with the transcript portion of the data.

Figure 3:
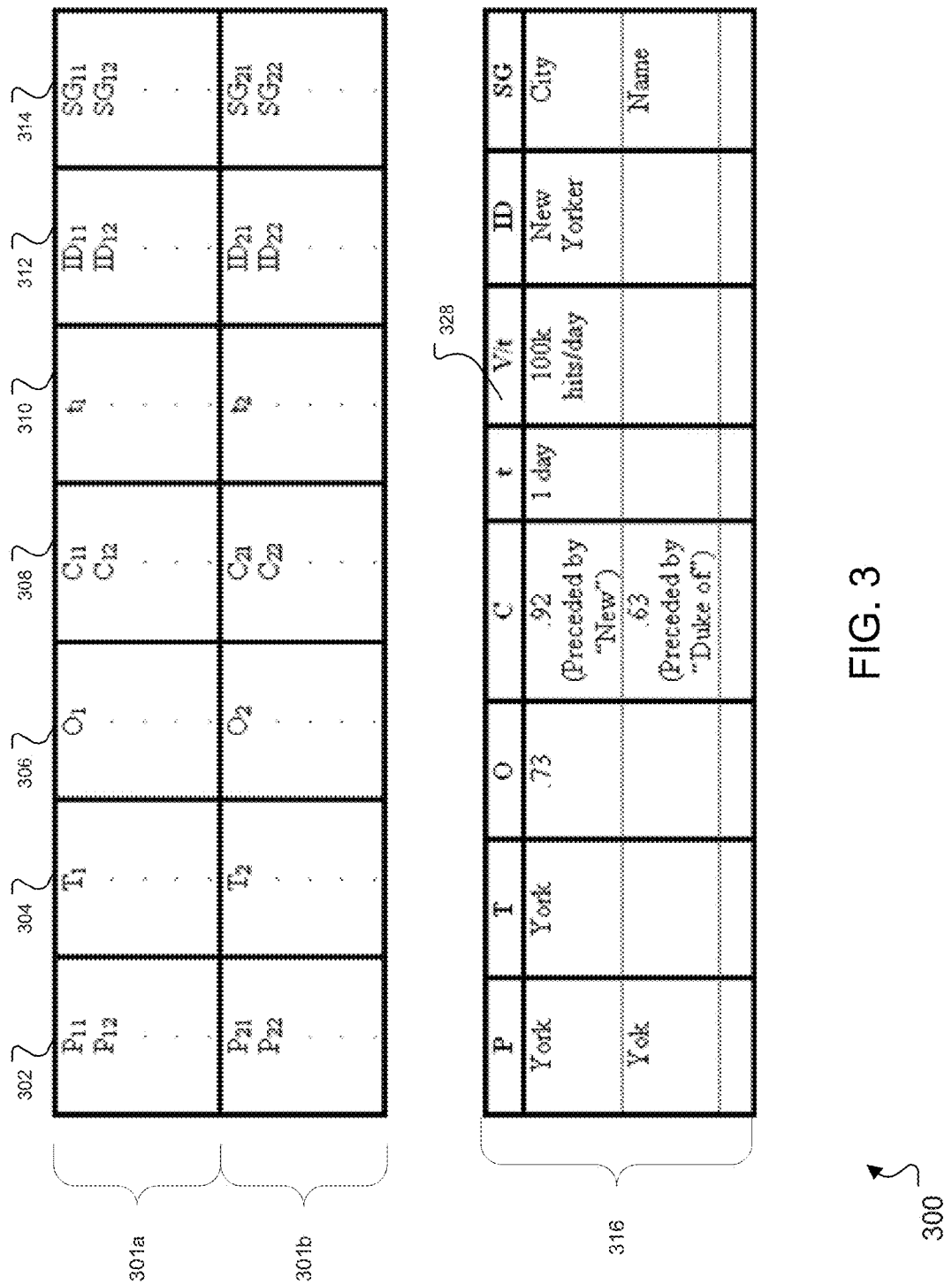
FIG. 3 shows schematically a data entry excerpt for a dictionary entry in a speech recognition model according to one implementation.

FIG. 3 shows schematically a data entry excerpt of a dictionary entry in a speech recognition model according to one implementation. The exemplary data entries 300 include a number of categories for assigning probability values to dictionary entries. The recognizer 250 uses the probability values to recognize words. The categories available in this example for identifying spoken sounds are: a portion of sound [P] 302, text associated with the sound [T] 304, occurrence information [O] 306, concurrence information [C] 308, a time the sound portion is recorded [t] 310, an identifier for a remote device [ID] 312, and a sub-grammar assignment [SG] 314.

Multiple portions of sound may be associated with one textual translation. This permits the speech recognition system to interpret a word correctly even if it is pronounced differently by different people. For example, when New York natives say "New York," the "York" may sound more like "Yok." A pronunciation dictionary 316 could store both pronunciations "York" and "Yok" and associate both with the text category 304 "York."

In another implementation, the sounds of letters, as opposed to entire words, may be associated with one or more textual letters. For example, the sound of the "e" in the word "the" may vary depending on whether the word "the" precedes a consonant or a vowel. Both the sound "ē" (pronounced before a vowel) and the sound "ə" (pronounced before a consonant) may be associated with a textual letter "e." A phoneme dictionary 270 may store both pronunciations and the associated textual letter "e."

The occurrence category 306 notes the frequency of the occurrence of the word "York." For example, an occurrence value may represent the relative popularity of a term in comparison to other terms. As an example, the total number of words in all search requests may be computed, and the number of times each identified unique word appears may be divided into the total to create a normalized occurrence number for each word.

The concurrence category 308, for example, notes the concurrence of "York" and "New," and provides a determination of the likelihood of appearance of both of these terms in a search request. Dictionary entries 301a, 301b may contain three types of information that assist in categorizing a search term entry. First, they may contain the words or other objects themselves. Second, they may include a probability value of each word or object being typed, spoken or selected. Third, the dictionary entries 301a, 301b may include the concurrence, or co-concurrence, probability of each word with other words. For example, if "York" was entered into the system, the concurrence weighting for "New York" may likely be higher than the concurrence weighting for "Duke of York" because "New York" may be entered more frequently than "Duke of York." Also, once a word is entered, all of the probabilities associated with that word can be updated and revised. That is because, when a person uses a word, they are more likely to use it again soon in the near future. For example, a person searching for restaurants may enter the word "Japanese" many times during a particular search session, until the person finds a good restaurant (and use of the word "Japanese" might make it more likely the person will soon enter "sushi" because of the common co-concurrence between the words). The co-concurrence value associated with "sushi" indicates this word is more likely than the words "sue she" to be the correct term when the word "Japanese" is used.

The time-recorded category 310 determines when the entry was received and includes a value that weights more recently received words heavier. The time-recorded category can also be used to determine statistical interests in common searches to make them readily accessible to other users requesting the same search.

The identification of remote device category 312 is used to determine which word is more probable based on information about the user, such as location. For example, if a news broadcaster from New York is speaking about a topic, there is a higher probability that the pronunciation of "Yok" is meant to be "York." However, if the news broadcaster is not from New York, there is a higher probability that the pronunciation of "Yok" may be the word "Yuck."

The sub-grammar category 314 in a pronunciation dictionary is an assignment of categories to certain words or terms. For example, if the speech recognition system is expecting a city, it only has to look at words with the sub-grammar "city." This way, when a speech recognition system is looking for a particular category (e.g. city), it can narrow down the list of possible words that have to be analyzed.

The pronunciation dictionary may contain further categories and is not confined to the example categories discussed above. An example of another category is a volume of words over a period of time [V/t] 328. This category includes words with the number of times each of the words was received during a defined period. The recognizer 250 may favor the selection of a word with a high value in the "V/t" category because this high value increases the probability of a word's occurrence. For example, if users submit a particular word several times during a 24-hour period, the probability is high that the word will be submitted by the same or other users during the next 24-hour period.

Figure 4:
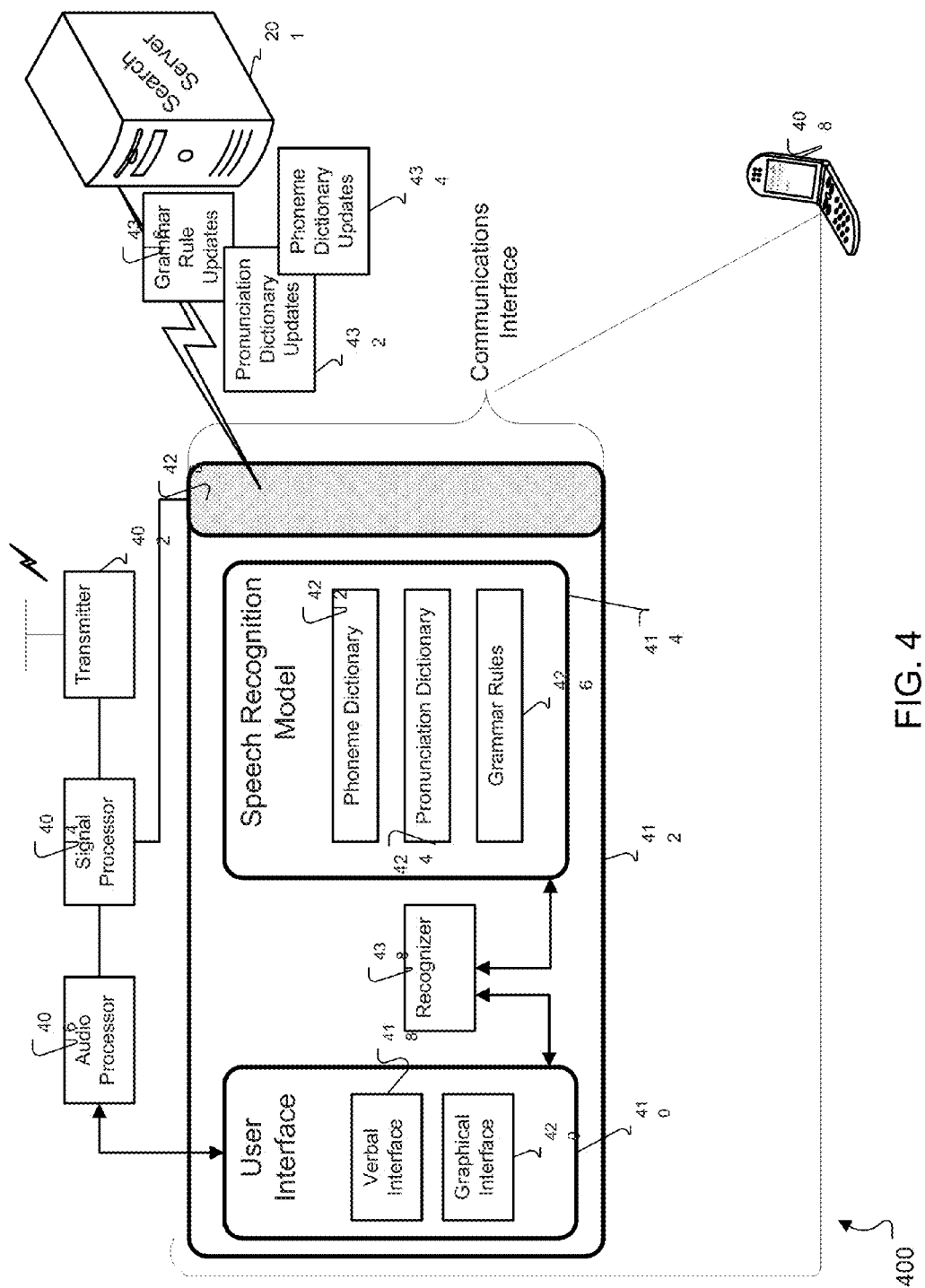
FIG. 4 is a schematic diagram of a system able to update remote devices with the most recent language model data according to one implementation.

FIG. 4 is a schematic diagram of a system able to update remote devices with the most recent language model data according to one implementation. The speech recognition model 414 may be implemented in a device such as a personal computer or a personal communicator such as a cellular telephone. Here, it is shown implemented in a cellular telephone 408. The telephone 408 receives and transmits information wirelessly using a transmitter 402, with the received signals being passed to signal processor 404, which may comprise digital signal processor (DSP) circuitry and the like. Normal voice communication is routed to or from an audio processor 406 via user interface 410.

User interface 410 handles communication with the user of the system 408 and includes a verbal interface 418, a graphical interface 420, and a data entry device. Graphical presentation information may be provided via display screen on the cellular telephone 408. Although the communication is shown for clarity as occurring through a single user interface 410, multiple interfaces may be used, and may be combined with other components as necessary.

The system 408 may include a number of modules 412, such as the user interface module 410 and the speech recognition module 414. The modules may be implemented in hardware or software stored in ROM, Flash memory, RAM, DRAM, and may be accessed by the system 408 as needed. In this implementation, the modules 412 are contained within the cellular device 408. The speech recognition model 414 may contain multiple stores of information, such as of dictionaries or rules. Typical dictionary entities may include a phoneme dictionary 422 for assigning meanings and probability values to phonemes, or letter sounds, and a pronunciation dictionary 424 to define specific pronunciations or probability values for words. Grammar rules 426 are another example of information stored in a speech recognition model. The search server 201, as discussed in association with FIG. 2, updates the dictionary entities and grammar rules remotely through a communications interface 428. The search server may send pronunciation updates 432, phoneme dictionary updates 434, and grammar rule updates 436 to the communications interface 428. The system 412 accepts the updates as needed to maintain the latest data.

A recognizer module 438 transmits communications between the user interface 410 and the speech recognition model 414. Similar to the speech recognition module in FIG. 2, the module in the device 408, may include rule-based models, statistical models, or both and may include various other modules to carry out searching or command tasks. For example, suppose a news event occurred involving a water-skiing accident and Paris Hilton. A verbal entry into the user interface 410 of cellular device 408 could consist of the search terms "Paris Hilton water-skiing accident." The recognizer 438 may take the verbal entry from the cellular device and associate the verbal entry with a text entry using the speech recognition model. The recognizer 438 may access "Paris Hilton" or "accident" from the pronunciation dictionary 424. However, water-skiing may not have been in the current dictionary or the co-concurrence data may not accurately reflect the current association between the words "Paris Hilton" and "water-skiing." Therefore, the system 412 may need an update of the pronunciation dictionary 424 from a search server 430 so that word recognition of "water-skiing" is improved. The search servers 201 may periodically transmit updates to the system 112 in the device 408. If the pronunciation dictionary entry for "water-skiing" is received before the user enters this word verbally, the recognizer 438 may recognize this word with a higher accuracy.

The system 408 may also run applications with more constrained grammar capabilities. These applications may use rule-based grammars with the ability to receive updates of new grammars. For example, consider an application that facilitates spoken access to Gmail. The command language is small and predictable, and it would make sense to implement the application using a rule-based grammar. However, there are some sub-grammars that would be desirable to update in order to allow users to refer, by voice, to messages from particular senders or messages with specific subject lines, labels, or other characteristics. Furthermore, it may be desirable to allow users to verbally search for messages with specific words or phrases contained in their content. Therefore, it would be useful to have the ability to update rule-based grammar or sub-grammars according to the current set of e-mail stored on a server for Gmail. For example, the system 412 may generate a sub-grammar for senders, such as "Received." The sub-grammar may then be updated with names of all senders from whom mail has been received, and the corresponding dictionary entries may be transmitted to the device 408. The updated dictionary entries may permit enhanced recognition when a user enters a verbal command to "Search Received Mail from Johnny Appleseed." For example, the portion of the command "Search Received Mail" may signal the system that the following words in the phrase are associated with a sender sub-grammar. The sender sub-grammars may then be searched to determine a match instead of searching all possible words in the dictionary entries. After the correct sender is identified, the command performs the search, and returns mail received from Johnny Appleseed.

Figure 5:
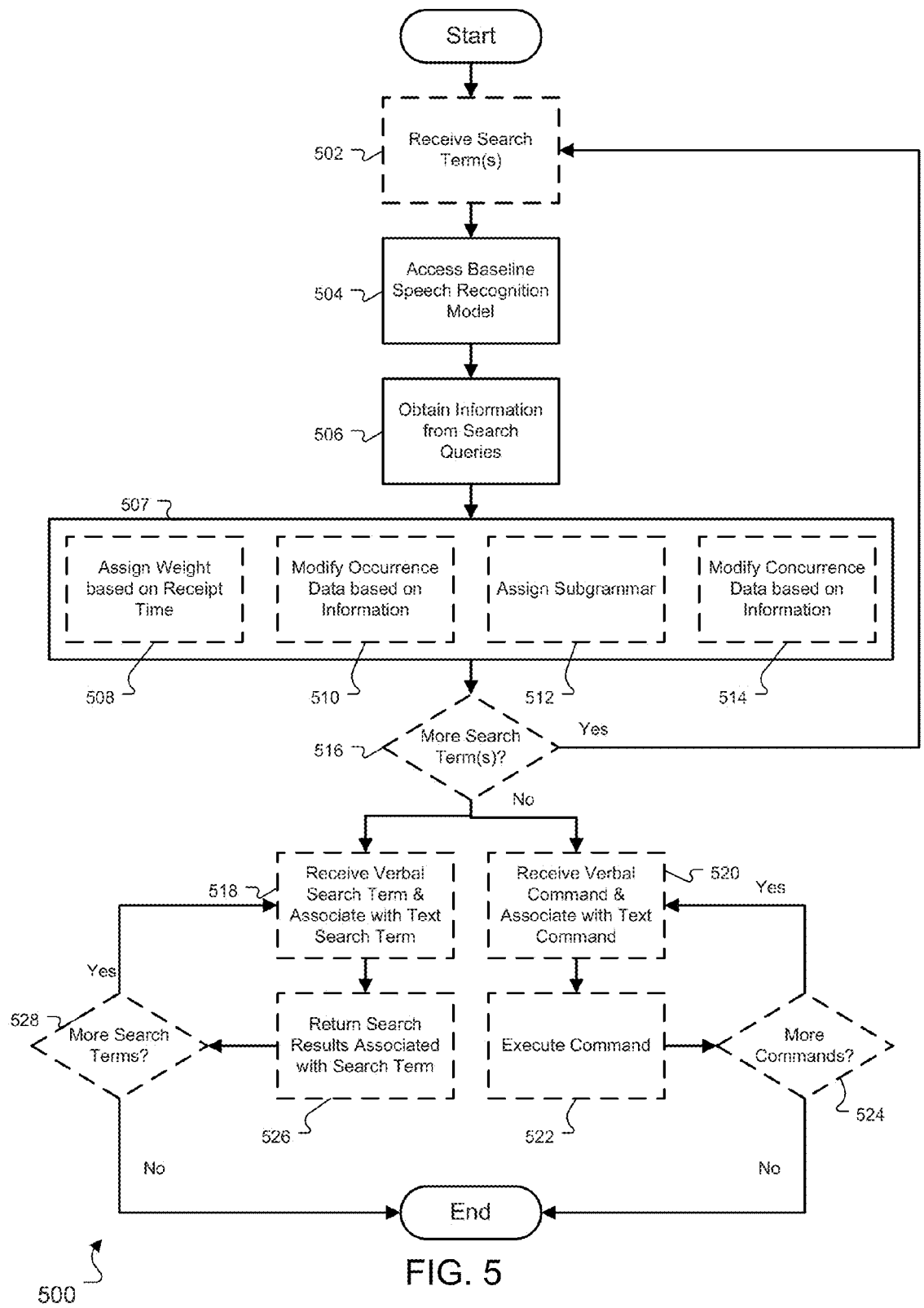
FIG. 5 is a flow chart showing exemplary steps for adding data to a speech recognition statistical model.

FIG. 5 is a flow chart showing exemplary steps for adding data to a speech recognition system. The chart shows an implementation in which a system updates a statistical speech recognition model based on user entered terms. The user entered terms may be accepted into the system as they are entered, or the terms may already reside in system storage. At step 502, search terms may be received wirelessly or accessed from system storage. The search terms may be textual input or verbal input. At step 504, the baseline speech recognition model is accessed to determine the existence of the search terms in the current dictionary. In step 506, the system obtains information from previous search queries in an attempt to find a match for the search terms entered. The system may determine to split the terms and continue analysis separately for each entered term or the system may determine multiple strings of terms belong together and continue to step 507 with all terms intact.

In step 507, four optional steps are introduced. Optional step 508 may assign a weighting value to the term(s) based on receipt time into the system. Optional step 510 may modify existing dictionary occurrence data based on the new information entered. Optional step 512 may assign a sub-grammar to the new information. Optional step 514 may modify existing dictionary concurrence data based on the new information entered. One, all, or none of steps 508, 510, 512 and 514 could be executed.

Once the search terms have been analyzed for occurrence, existence and weightings, step 516 verifies no further search terms remain. If more search terms exist, the process begins again in step 502. If a certain number of search terms has not been received, the system continues to analyze the entered search term(s). Alternatively, the system may continually update the dictionary entries.

The speech recognition system determines whether or not the data is a verbal search term in step 518 or a verbal system command in step 520. For example, suppose one's remote device is a cellular telephone with a telephone number entry titled "Cameron's phone number." The verbal term entered could be "call Cameron." The cellular device may receive the terms and transfer them to a speech recognition system. The speech recognition system may decide this is a system command and associate the verbal command with a text command on the cellular device as shown in step 520. In the example above, the speech recognition system would allow a cellular device to make the phone call to "Cameron," where the translated verbal search term is associated with a telephone number, thereby executing the call command in step 522. However, the speech recognition system may determine the received verbal term is a search and attempt to associate the verbal search term with a test search term as shown in step 518. If the entry "call Cameron" is determined not to be a system command, the speech recognition system attempts to match the term with using dictionary entries derived from daily news broadcasts and text search terms, such as "Cameron Diaz calls off the wedding." Once a textual term is associated with the spoken verbal search, the text term may be transmitted to the search server 201. The search server 201 may generate search results using the text search term, and, the results are returned to the cellular device in step 526. The system checks for additional verbal search terms in step 528. If no further system commands or search terms exist, the processing for the entered data ends.

Figure 6:
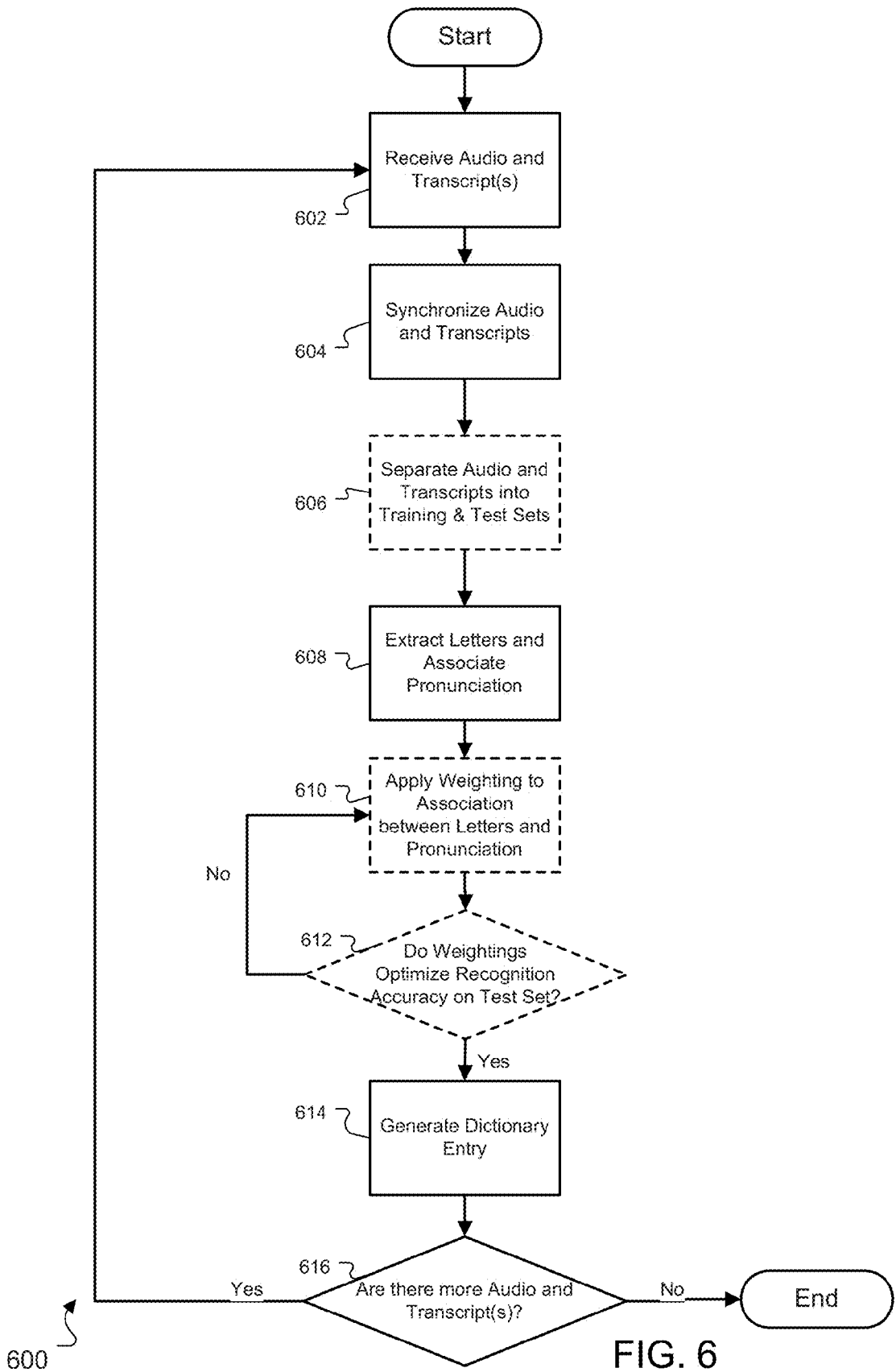
FIG. 6 is a flow chart showing exemplary steps for adding data to a pronunciation model.

FIG. 6 is a flow chart showing exemplary steps for adding data to a pronunciation model. The data for updating acoustic models may include captioned video. The data may be used to update acoustic models used for spoken search queries since new or current words previously not in the acoustic model are often provided from new captioned video broadcasts. The flow chart shows an implementation in which a system updates a pronunciation model based on received audio or transcript information.

In step 602, audio or transcript information is received wirelessly or accessed from system storage. The information may be textual input, audio input, video input, or any combination thereof. In step 604, synchronizing the audio and transcript information is performed. This ensures the audio information "matches" the associated transcript for the audio. Any piece of audio information or transcript information may be divided into training and test data for the system. The training data is analyzed to generate probability values for the acoustic model. As shown in step 608, this analysis may include extracting letters to associate pronunciation of words. A weighting system is introduced to appropriately balance the new data with the old data. In step 610, the associations between letters and pronunciations are weighted.

In step 612, verification is performed on the test set to determine if weightings optimize recognition accuracy on the test set. For example, an acoustic model could receive multiple audio clips about "Britney Spears" and turn them into test sets. The system may associate several weights with the corresponding preliminary dictionary entry in an attempt to maximize recognition accuracy when the dictionary entries are accessed to interpret the test set of audio recordings. The system then selects the weighting that optimizes recognition accuracy on the test set. If the weightings optimize recognition accuracy on the test set, a dictionary entry can be generated in step 614. If the weights cannot optimize recognition, step 610 is repeated. When a dictionary term is generated, the method 600 executes, in step 616, operations to determine if more audio transcripts are available. If more audio or transcripts exist, the process returns to step 602. If no more audio or transcript information is available, the process terminates.

Figure 7:
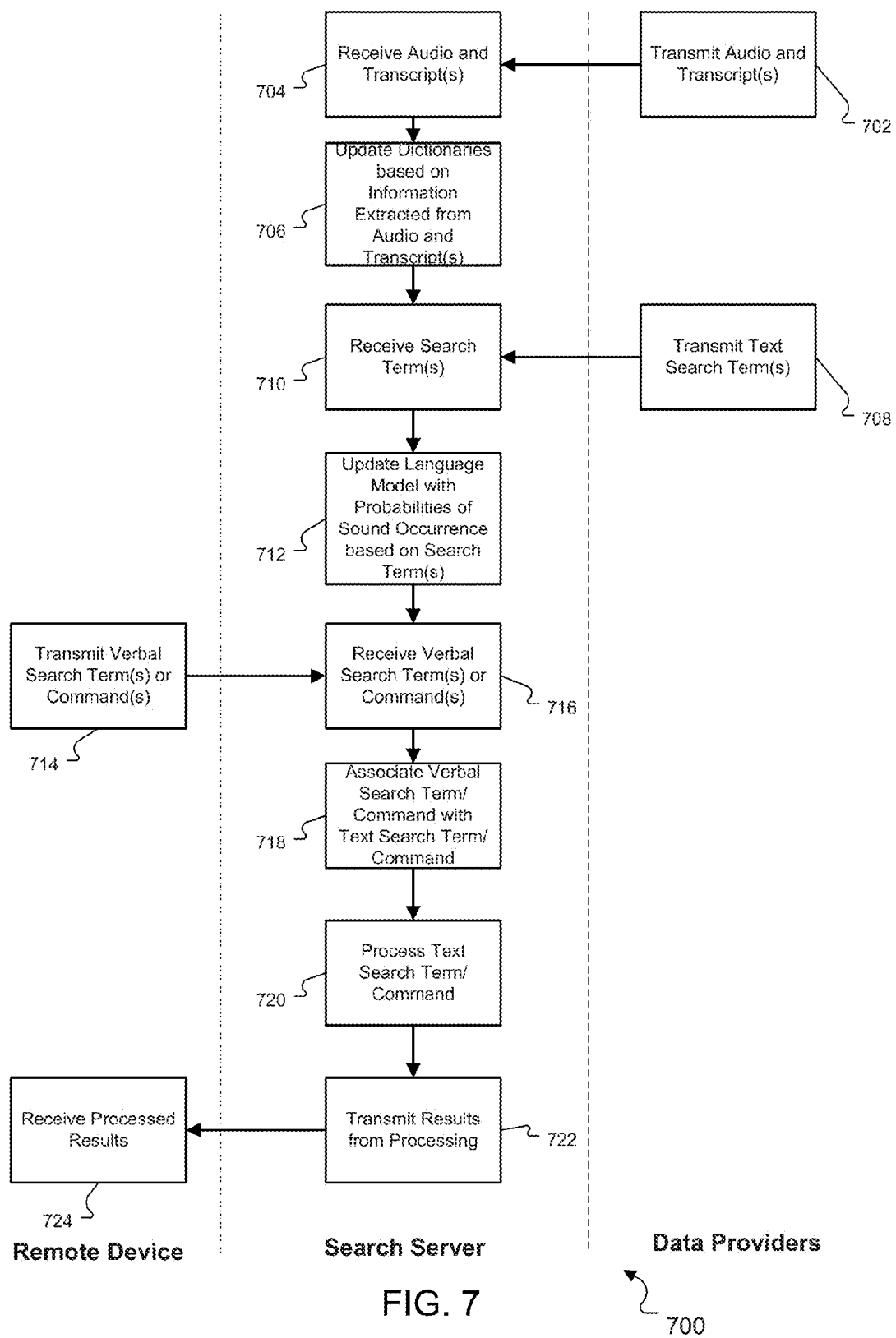
FIG. 7 is a flow chart of exemplary steps providing search results to a user in response to a request from a remote device.

FIG. 7 is a flow chart of exemplary steps providing search results to a user in response to a request from a remote device. The flow chart is divided to indicate steps carried out by each of three entities: a remote device, a search server or a data provider.

At step 702, the data provider transmits audio and transcript information such as a news broadcast. The search server receives the audio and transcript information 704, extracts broadcast content, and updates dictionaries based on the information extracted 706. In parallel or at a different time, a data provider may transmit text search terms 708 to be received at the search server in step 710. The search server uses the text search terms to update the language model with appropriate probabilities of sound occurrence in step 712.

In step 714, a remote device may transmit verbal search terms or commands to the search server. The search server receives the transmitted verbal search terms in step 716. Step 718 associates verbal search terms or commands with text search terms or commands. The search server processes text search terms and commands in step 720 and transmits results to the remote device in step 722. For example, the server may return search results based on the received verbal search terms. In step 724, the remote device receives processed results from the original transmission of audio and transcript information.

Figure 8:
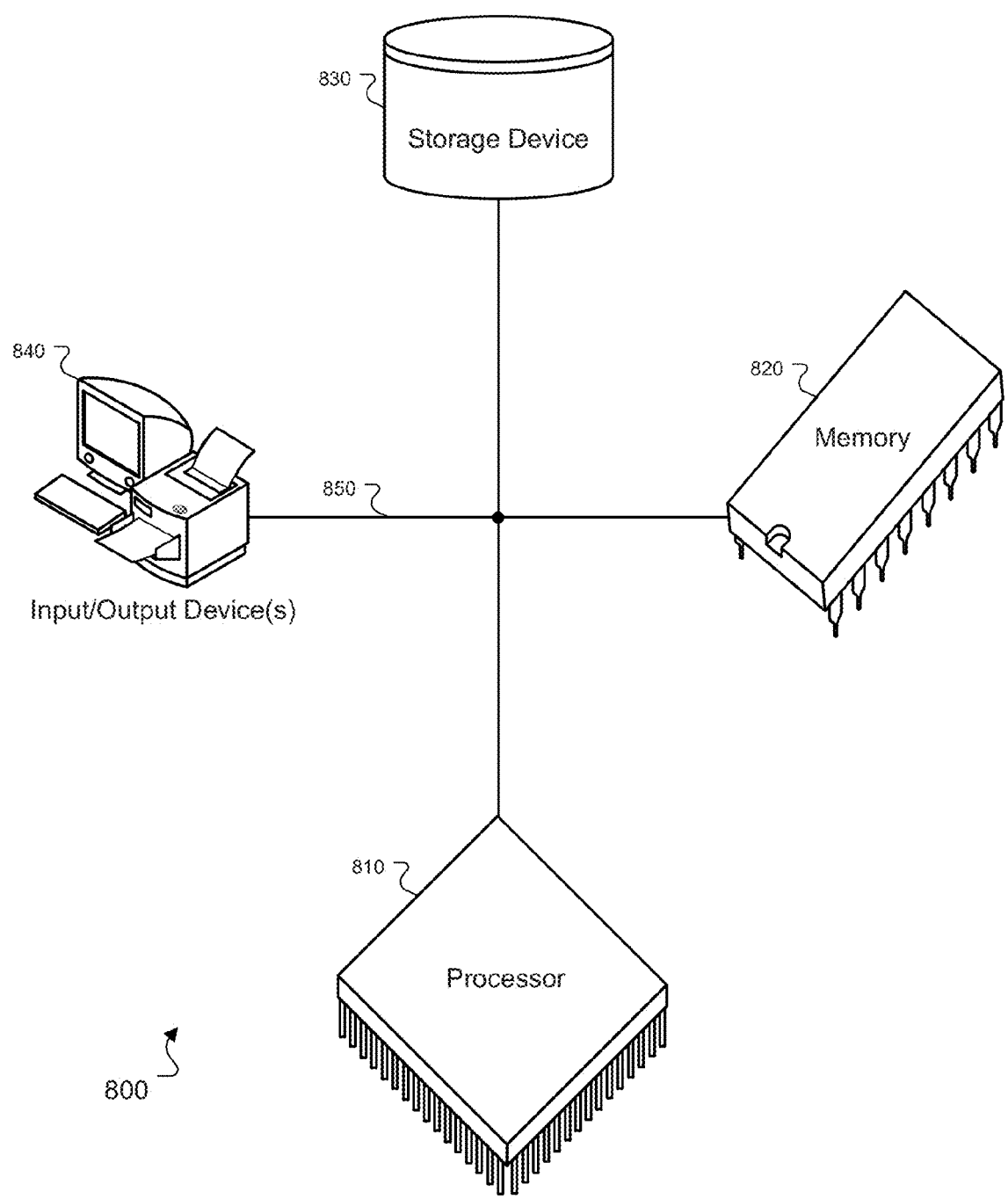
FIG. 8 is a schematic diagram of a computer system.

FIG. 8 is a schematic diagram of a computer system 800 that may be employed in carrying out the processes described herein. The system 800 can be used for the operations described in association with method 600, according to one implementation. For example, the system 800 may be included in either or all of the search server 108, the wireless communication device 106, and the remote computer 104.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, both the search server 201 and the remote device 206 may have a speech recognition system with dictionaries. The remote device 206 may update the dictionaries at the search server 201 in the same manner that the search server updates the dictionaries stored on the remote device 206.

In one implementation, a computer, such as the personal computer 210 of FIG. 2 may also transmit video with audio recordings and transcripts. For example, a user may submit to the search server 201 captioned video that the user created on the personal computer. The synchronizer 221 and the dictionary generator 222 may then process the user-created captioned video in a similar manner to the processing method used on captioned video from the television transmitter 234.

Also, the logic flows depicted in the figures do not require the particular order shown, or sequential order, to achieve desirable results. In addition, although some acts may have been identified expressly as optional, other steps could also be added or removed as appropriate. Also, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   receiving, by a computing system and as having been transmitted by a first computing device, a textual search query that was specified by user input at the first computing device, the textual search query including a textual search term;
   causing, by the computing system and as a result of having received the textual search query, search results that correspond to the textual search query to be generated through a search that uses the textual search query and provided for receipt and presentation by the first computing device;
   determining, by the computing system and as a result of having received the textual search query, whether the textual search term exists in a dictionary of terms for a speech recognition system;
   adding, by the computing system and as a result of determining that the textual search term is not in the dictionary of terms for the speech recognition system and as a result of having received the textual search query, the textual search term to the dictionary of terms for the speech recognition system due to inclusion of the textual search term in the textual search query, in order to generate an updated dictionary of terms for the speech recognition system;
   identifying, by the computing system, acoustic model data for the textual search term; and
   providing, by the computing system, the acoustic model data for the textual search and the updated dictionary of terms for the speech recognition system for use in a verbal translation that includes:
      receiving a verbal query that was specified by user input at another computing device and that includes a verbal representation of the textual search term, and
      translating, using the acoustic model data for the textual search term and the updated dictionary of terms for the speech recognition system, the verbal query into a textual representation of the verbal query, the textual representation of the verbal query including the textual search term.

2. The computer-implemented method of claim 1, wherein determining whether the textual search term exists in the dictionary of terms for the speech recognition system includes splitting the textual search term into multiple textual search terms and determining whether each of the multiple textual search terms exists in the dictionary of terms.

3. The computer-implemented method of claim 1, further comprising:
transmitting, by the computing system, the updated dictionary of terms for the speech recognition system to the another computing device, wherein the another computing device uses the updated dictionary of terms to perform the translation of the verbal query that was received by user input specified at the another computing device into the textual representation of the verbal query.

4. The computer-implemented method of claim 1, further comprising:
assigning a probability value to a dictionary entry for the textual search term within the updated dictionary of terms based on a chronological receipt of the textual search term with respect to terms being received in other search queries.

5. The computer-implemented method of claim 1, further comprising:
assigning a probability value to a dictionary entry for the textual search term within the updated dictionary of terms based on a number of times that the textual search term is received within search queries, such that at least three dictionary entries for corresponding terms within the updated dictionary of terms have three different assigned probability values based on respective number of times that the corresponding terms have been received within the search queries.

6. The computer-implemented method of claim 1, wherein identifying the acoustic model data for the textual search term includes identifying the acoustic model data for the textual search term from a captioned video broadcast that includes captioned text that includes the textual search term.

7. The computer-implemented method of claim 1, further comprising:
adding, by the computing system and in response to receiving the textual search query, other terms that are associated with the textual search term to the dictionary of terms for the speech recognition system, wherein the other terms would not have otherwise been included in the dictionary of terms for the speech recognition system without receipt of the textual search query.

8. One or more machine-readable storage devices that are programmed with instructions that, when executed by one or more programmable processors, cause performance of operations that comprise:
receiving, by a computing system and as having been transmitted by a first computing device, a textual search query that was specified by user input at the first computing device, the textual search query including a textual search term;
causing, by the computing system and as a result of having received the textual search query, search results that correspond to the textual search query to be generated through a search that uses the textual search query and provided for receipt and presentation by the first computing device;
determining, by the computing system and as a result of having received the textual search query, whether the textual search term exists in a dictionary of terms for a speech recognition system;
adding, by the computing system and as a result of determining that the textual search term is not in the dictionary of terms for the speech recognition system and as a result of having received the textual search query, the textual search term to the dictionary of terms for the speech recognition system due to inclusion of the textual search term in the textual search query, in order to generate an updated dictionary of terms for the speech recognition system;
identifying, by the computing system, acoustic model data for the textual search term; and
providing, by the computing system, the acoustic model data for the textual search and the updated dictionary of terms for the speech recognition system for use in a verbal translation that includes:
receiving a verbal query that was specified by user input at another computing device and that includes a verbal representation of the textual search term, and
translating, using the acoustic model data for the textual search term and the updated dictionary of terms for the speech recognition system, the verbal query into a textual representation of the verbal query, the textual representation of the verbal query including the textual search term.

9. The one or more machine-readable storage devices of claim 8, wherein determining whether the textual search term exists in the dictionary of terms for the speech recognition system includes splitting the textual search term into multiple textual search terms and determining whether each of the multiple textual search terms exists in the dictionary of terms.

10. The one or more machine-readable storage devices of claim 8, wherein the operations further comprise:
transmitting, by the computing system, the updated dictionary of terms for the speech recognition system to the another computing device, wherein the another computing device uses the updated dictionary of terms to perform the translation of the verbal query that was received by user input specified at the another computing device into the textual representation of the verbal query.

11. The one or more machine-readable storage devices of claim 8, wherein the operations further comprise:
assigning a probability value to a dictionary entry for the textual search term within the updated dictionary of terms based on a chronological receipt of the textual search term with respect to terms being received in other search queries.

12. The one or more machine-readable storage devices of claim 8, wherein the operations further comprise:
assigning a probability value to a dictionary entry for the textual search term within the updated dictionary of terms based on a number of times that the textual search term is received within search queries, such that at least three dictionary entries for corresponding terms within the updated dictionary of terms have three different assigned probability values based on respective number of times that the corresponding terms have been received within the search queries.

13. The one or more machine-readable storage devices of claim 8, wherein identifying the acoustic model data for the textual search term includes identifying the acoustic model data for the textual search term from a captioned video broadcast that includes captioned text that includes the textual search term.

14. The one or more machine-readable storage devices of claim 8, wherein the operations further comprise:
adding, by the computing system and in response to receiving the textual search query, other terms that are associated with the textual search term to the dictionary of terms for the speech recognition system, wherein the other terms would not have otherwise been included in the dictionary of terms for the speech recognition system without receipt of the textual search query.

15. The computer-implemented method of claim 1, further comprising:
receiving, by the computing system and as having been transmitted by a second computing device, a second textual search query that was specified by user input at the second computing device, the second textual search query including a second textual search term;
causing, by the computing system and as a result of having received the second textual search query, search results that correspond to the second textual search query to be generated through a search that uses the second textual search query and provided for receipt and presentation by the second computing device;
assigning a first probability value to a first dictionary entry for the textual search term within the updated dictionary of terms based on a chronological receipt of the textual search term with respect to terms being received in other search queries; and
assigning a second probability value to a second dictionary entry for the second textual search term within the updated dictionary of terms based on a chronological receipt of the second textual search term with respect to terms being received in other search queries,
wherein the first probability value is different from the second probability value,
wherein the first probability value is stored concurrently with the second probability value within the updated dictionary of terms.

16. The computer-implemented method of claim 4, wherein assigning the probability value to the dictionary entry for the textual search term includes modifying an existing probability value assigned to the dictionary entry for the textual search term.

17. The computer-implemented method of claim 1, wherein:
identifying the acoustic model data for the textual search term is performed as a result of the computing system having determined that the textual search term is not in the dictionary of terms for the speech recognition system; and
providing the acoustic model data for the textual search query for use in the verbal translation is performed as a result of the computing system having determined that the textual search term is not in the dictionary of terms for the speech recognition system.

* * * * *